(12) United States Patent
LaPointe et al.

(10) Patent No.: US 8,018,439 B2
(45) Date of Patent: Sep. 13, 2011

(54) MOBILE APPLIANCE SYSTEM AND METHOD ENABLING EFFICIENT ENTRY

(75) Inventors: Jacques LaPointe, Calgary (CA); Roland E. Williams, Martinez, CA (US)

(73) Assignee: Zi Corporation of Canada, Inc., Calgary, Alberta (CA)

( * ) Notice: Subject to any disclaimer, the term of this patent is extended or adjusted under 35 U.S.C. 154(b) by 767 days.

(21) Appl. No.: 11/689,198

(22) Filed: Mar. 21, 2007

(65) Prior Publication Data

US 2007/0285397 A1    Dec. 13, 2007

Related U.S. Application Data

(60) Provisional application No. 60/784,655, filed on Mar. 22, 2006.

(51) Int. Cl.
*G09G 5/00* (2006.01)
(52) U.S. Cl. .................. 345/168; 345/169; 345/172
(58) Field of Classification Search .......... 345/156–172; 707/3–6, 102, 999.005
See application file for complete search history.

(56) References Cited

U.S. PATENT DOCUMENTS

| 7,102,620 B2* | 9/2006 | Harries et al. ................. 345/169 |
| 2003/0090468 A1* | 5/2003 | Finke-Anlauff ............... 345/169 |
| 2005/0262054 A1* | 11/2005 | Nurmi ............................... 707/3 |
| 2006/0013487 A1* | 1/2006 | Longe et al. ................... 382/229 |
| 2006/0022950 A1* | 2/2006 | Friedrichs, IV ............... 345/169 |
| 2006/0190819 A1* | 8/2006 | Ostergaard et al. ........... 715/534 |
| 2007/0027852 A1* | 2/2007 | Howard et al. .................... 707/3 |
| 2007/0156747 A1* | 7/2007 | Samuelson .................... 707/102 |

OTHER PUBLICATIONS

Anonymous, "Qix Functions", Web Document, Mar. 2, 2006.
Zi Corporation, "Mobile Phone Technology Opens Up New Revenue Streams", Zi Corporation white paper on the Qix service discovery engie, May 31, 2005, pp. 1-5.

* cited by examiner

*Primary Examiner* — Amare Mengistu
*Assistant Examiner* — Hong Zhou
(74) *Attorney, Agent, or Firm* — Michael A. Glenn; Glenn Patent Group

(57) ABSTRACT

A mobile appliance and a method of using a mobile appliance are disclosed. The mobile appliance may include a microprocessor, a data entry device, a monitor, a candidate selection device, and software having instructions for controlling the microprocessor. A series of characters are provided to the appliance, and the series of characters is used to both indicate a function and indicate information for that function.

20 Claims, 3 Drawing Sheets

MOBILE APPLIANCE SYSTEM AND METHOD ENABLING EFFICIENT ENTRY

CROSS-REFERENCE TO RELATED APPLICATION

This application claims the benefit of priority to U.S. provisional patent application Ser. No. 60/784,655, filed on Mar. 22, 2006.

FIELD OF THE INVENTION

The present invention relates to mobile appliances, such as personal digital assistants and cell phones.

BACKGROUND OF THE INVENTION

Mobile appliances having wireless connectivity, such as cellular telephones, have become so feature-rich that it has become increasingly difficult for a user to be able to access these features in a simple fashion. For example, a single wireless mobile appliance can provide the following features: make and receive telephone calls, take photographs, provide a calendar and update other devices where the calendar can be accessed, allow sending and receiving of emails, allow interaction with the Internet, provide video games, and provide a calculator. Each of these features may have its own menus designed to assist the user with using a feature. The use of menu structures is well established but has proven to be confusing for the ordinary user in part because of limited screen area and the difficulty of building intuitive interfaces.

Usually, a user needs to be able to identify the desired application accurately or it may not be discovered. If the user is unable to identify a desired application, a last resort has conventionally been to provide a file labeled "Help". However, by the time a user resorts to using the "Help" feature, the user often has little patience to use the "Help" feature, and frequently the user abandons the effort to find and use a feature.

Automated discovery techniques and products are available. For example, a product commonly referred to as "Qix" has been made commercially available. The Qix product directly indexes features or uses synonyms to assist the user with using features of a mobile appliance. Using a mobile appliance having "Qix", the user may enter data via a data entry device, such as a telephone keypad. The keypad may have keys that are associated with numbers, letters and/or other characters. By pressing a key, the mobile appliance will cause a monitor to display candidates that may be desired by the user. For example, the monitor may display letters, words, and/or numbers corresponding to the pressed key(s), as well as icons representing features that may be provided by the mobile appliance. The user may then select from the candidates, for example by using a cursor and an "Enter" key, to indicate what the user desires.

In addition to supplying literal and disambiguated candidates, the Qix product may use direct indexing, pointers or synonym tables to identify candidates. For example, if a user enters the string 746, the mobile appliance may display the word "pin" and also the word "show" as possible candidates. The mobile appliance might also display synonyms for a candidate. Using the example above, if the user pressed the keys 746, the user might be trying to enter the word "Photo" in order to indicate a desire to use a function of the mobile appliance that is related to photos. In response, the mobile appliance might display the word "Camera" or an icon of a camera to indicate a function provided by the mobile appliance. For example, the function might be the ability to take photographs (i.e. the "Camera" function). As another example, the function desired by the user might be the ability to present previously stored photographs in succession, and so the mobile appliance might display the phrase "Slide Show" or the icon of a projector. Note that the "Camera" function, the "Slide Show" function and/or their icons might be displayed even though the user did not press keys corresponding to the words "camera" or "slide show" because the mobile appliance associates the words "camera" and "slide show" as synonyms for the key presses corresponding to the word "photo". The extent of this functionality can be determined by a textual dictionary, pointer and synonym tables stored locally in the appliance.

In the existing art, selection of proposed candidates matching the entered sequence may cause an appropriate action to be taken by the appliance. Candidates may reside locally or remotely. However, one class of action that may be required is a broader search in response to an inquiry. Discovery of services or synonyms that are external to the appliance or an associated preconditioned server are feasible, but constrained by the availability of the network and the user's ability to navigate the external services. Usually, the user is forced to engage in a lengthy procedure for each inquiry, and this may be discouraging, thereby limiting the value of the service.

SUMMARY OF THE INVENTION

The invention may be embodied as a mobile appliance. The mobile appliance may include a microprocessor, a data entry device, a monitor, a candidate selection device, and software having instructions for controlling the microprocessor.

The data entry device may be in communication with the microprocessor, and may be capable of allowing a user to provide a series of characters to the microprocessor. The data entry device may include a set of keys operable by human fingers, each key having at least one character displayed thereon. For example, the character may be a number or a letter. An example of such a data entry device may be found on most telephones in the form of the 12-button key pad used to dial telephone numbers.

The monitor may be in communication with the microprocessor, and may be capable of displaying candidates corresponding to the series of characters. For example, the monitor may be a liquid crystal display, or may be a panel of light emitting diodes.

The candidate selection device may be in communication with the microprocessor, and may be capable of allowing the user to select one of the displayed candidates. For example, the selection device may be a joystick or a set of arrow keys. Such selection devices may be used to move a cursor displayed on the monitor.

The software may cause the microprocessor to interpret selection of one of the displayed candidates as indicating both a function and input information for that function. For example, the function may be a telephone number dialer and the characters may be interpreted to be a desired telephone number. Another type of function is a text message processor, and the characters may be interpreted to be letters of a phrase that should be part of a text message. A third type of function may be an Internet browser, and the characters may be interpreted to be a search query. Some of the functions may be internal to the appliance and reside in a memory of the appliance, while others of the functions may be external to the appliance. External functions may reside on a computer that is remote from the appliance, and communication between the appliance and the remote computer may be accomplished at least in part by a wireless communication channel, such as those used by cellular telephones.

The software module may have instructions for presenting the user with more than one function and allowing the user to select one of the functions. Candidates corresponding to functions may be displayed on the monitor differently from candidates corresponding to non-functions. Furthermore, internal functions may be displayed on the monitor differently from external functions.

The invention may be embodied as a method. In one such method, a mobile appliance is provided. The mobile appliance may be like that described above. A series of characters may be provided to the microprocessor via the data entry device. The microprocessor may respond by causing the monitor to display candidates corresponding to the series of characters, and then the selection device may be used to cause selection of one of the displayed candidates. The selected candidate may be provided to the microprocessor, and the microprocessor may interpret the selected candidate as indicating both a function and input information for that function. The function may then be invoked and the series of characters may be provided as input information to the function.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
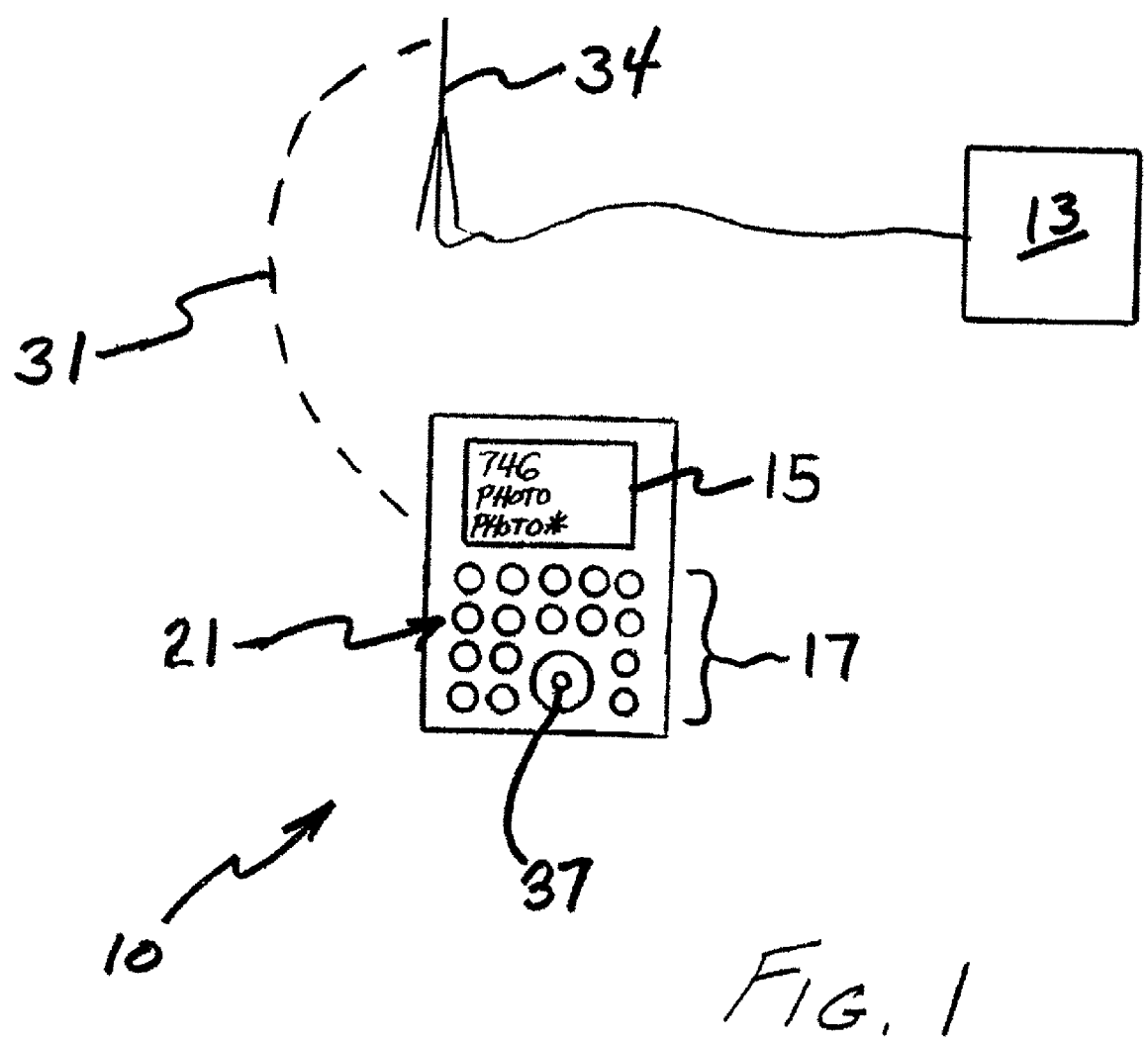
FIG. 1 is a schematic of an appliance according to the invention.

The invention may be embodied as a mobile appliance 10 having the ability to connect to a network 13 the purpose of retrieving information that may be desired by the user of the mobile appliance 10. FIG. 1 depicts such an appliance 10. The mobile appliance 10 may have the ability to receive and interpret sequences of key presses as numbers, letters, words, phrases, icons and other candidates that correspond to the key presses and that may be desired by the user. Included in this ability may be the ability to predict a word or phrase desired by the user so that the user is not required to press all keys needed to spell the entered word or phrase. A monitor 15 of the mobile appliance 10 may be used to display candidates corresponding to the key presses.

Figure 2:
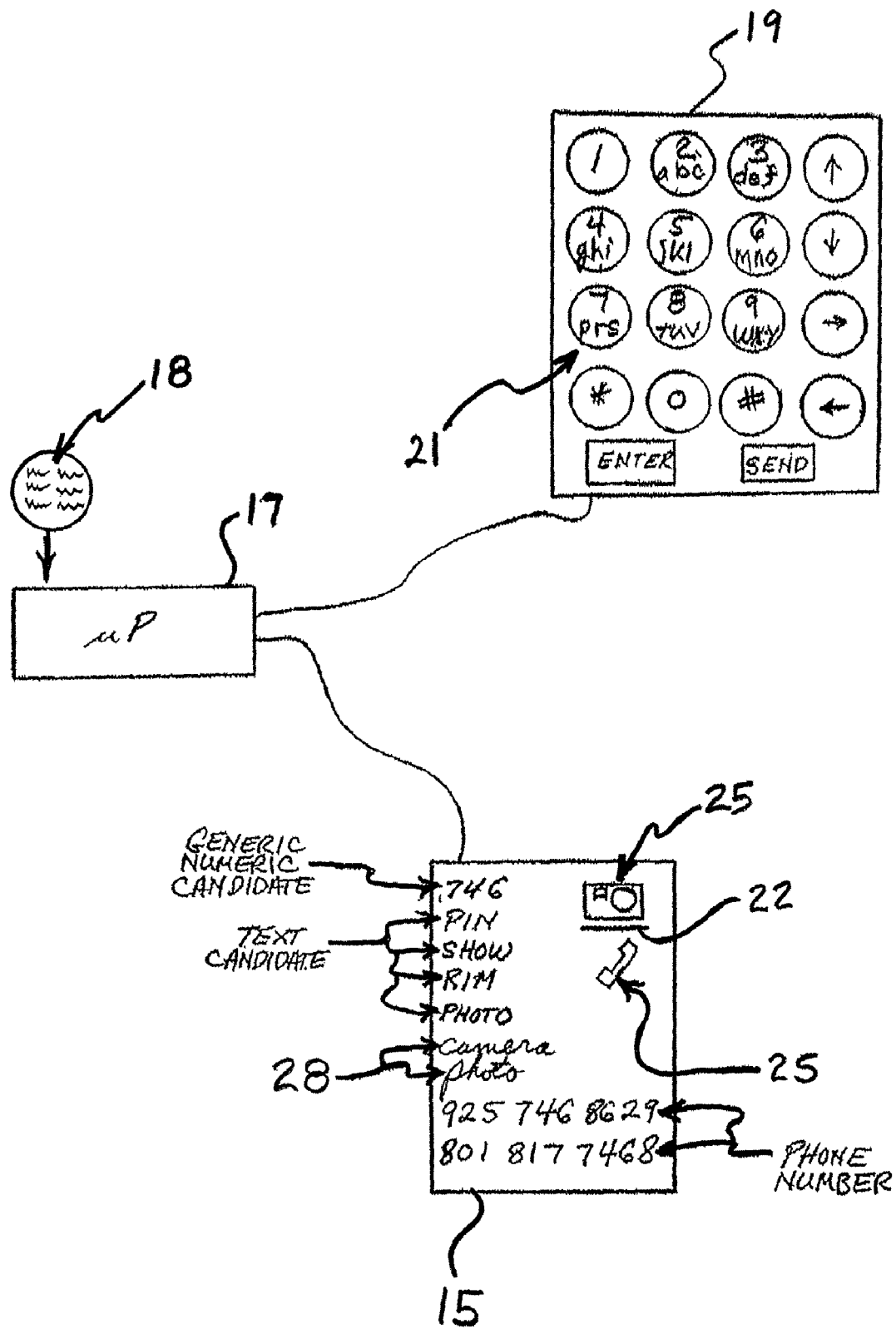
FIG. 2 is a schematic of another appliance according to the invention.

FIG. 2 depicts components of a mobile appliance 10 according to the invention. In FIG. 2 there is shown a monitor 15 in communication with a microprocessor 17. Software 18 provides instructions to the microprocessor 17 in order to cause the microprocessor 17 to execute certain tasks. Also shown in FIG. 2 is a data entry device 19 in communication with the microprocessor 17.

The monitor 15 is depicted in FIG. 2 to reflect its appearance after a user has pressed a series of keys 21. In this example, the user has already progressed through the initial few key presses to enter the sequence corresponding to keys 21 having 7, 4 and 6 printed on them. If the user simply presses the key 21 designated as "Enter" then the appliance 10 may assume the user desires to place a telephone call and automatically display telephone numbers having the string "746" somewhere in the phone number. The user may then use the cursor to identify which of the phone numbers is desired and select that phone number for dialing by pressing the "Enter" key. Upon selecting a phone number for dialing, the mobile appliance 10 might dial the selected telephone number.

Alternatively, the user might move a cursor to identify "746" on the monitor 15, and then select that by pressing the "Enter" key 21. The mobile appliance 10 may then assume that the user is attempting to enter a telephone number or a text message, and may prompt the user to indicate which is desired. If the user indicates that a telephone number is desired, then the appliance 10 may display numbers having "746" somewhere in the number. However, if the user indicates that he/she desires to create a text message, then the text message function may be invoked, with 746 being the first entry in the text message. Further presses of the keys 21 may be interpreted as being part of the text message until the user indicates that he/she is finished creating the text message.

Also shown on the monitor 15 depicted in FIG. 2 are words that correspond with the pressed keys 21, such as "pin", "show", "rim" and "photo". By moving the cursor 22 to one of these words, the user may indicate a desire to enter that text. Upon doing so, the mobile appliance 10 might assume the user desires to create a text message and then automatically place the selected word in a text message. In this manner, the user is allowed to create a text message without first indicating a desire to do so—the selection of the first word in the text message automatically invokes the function. Further key presses might be assumed to indicate additional words that should be placed in the text message. Upon completing the text message, the user might press a key designated for this purpose (e.g. the "Enter" key), and the mobile appliance 10 may then present the user with a list of options corresponding to the text message. For example, the mobile appliance 10 might display options corresponding to "email" or "save", to allow the user to respectively send an email or save the text message.

In addition, FIG. 2 shows icons 25 and italicized words 28 indicating to the user the ability to select a function provided by the mobile appliance 10. In this example of the invention, italics 28 and icons 25 are used in FIG. 2 to identify a function that the user may access via the mobile appliance 10. In this manner, functions may be easily identified and selected, and similarly non-functions (e.g. text or number strings) may be easily identified and selected. Other means of indicating functions may be used. For example, FIG. 1 shows an asterisk being used, but other characters be used and located near words or characters corresponding to functions of the mobile appliance 10.

In general, a series of key presses may result in a plurality of possible interpretations. Some of these interpretations may be logical and easily disambiguated. Stored interpretations may be accessed using disambiguation and predictive techniques. The display of candidates may be made in an order preferred by the user or the manufacturer, or a combination of both.

Some entered sequences may fail to match any stored data in the appliance 10 or its known servers, but in this case the user has either failed to correctly enter the sequence of key presses or else wishes to search for information or use a function that does not reside on the appliance 10. Such information and functions are referred to herein as being "external" to the appliance 10.

The mobile appliance 10 may have additional functions that allow for automatic generation of inquiry information and/or functions. For example, in addition to displaying candidates such as numbers, letters, words, phrases and functions that correspond to a series of key presses, the mobile appliance 10 may also present the user with information obtained from a network 13, such as the Internet. In such an appliance 10, starting with the "home" or "idle" screen, a key press or series of key presses may cause the appliance 10 to automatically display a literal entry, the number sequence, functions provided by the mobile appliance 10, as well as information and functions that are not resident on the appliance 10, such as information and/or functions that are available via a network server that is in communication with the Internet.

If a candidate is selected by using the "Send" key 21, the mobile appliance 10 may be programmed to interpret this as a request for information or a function from a source external to the appliance 10. As an example, a single press of a key 21 may submit the candidate to an external Internet search engine, such as the search engine commonly referred to as Google®. Other methods of indicating whether a candidate should be used by the mobile appliance 10 internally or externally may be used to determine the desire of the user. Such methods include but are not limited to displaying candidates in duplicate with attribute markers such as a "?" appended or pre-pended to differentiate between candidates that will invoke a function that is external to the appliance from those candidates that will invoke a function that is internal to the appliance.

Once an indication has been given that the user desires to use an external network, the appliance 10 may be configured to interact with the external network and display retrieved information. In order to interact with the external network, a communications channel 31, such as with a cellular communication antenna 34, may need to be established. Because information can be expected to be relatively complex and may have multiple attributes, a suitable software application may be invoked. For example, a browser, suitably arranged to operate on the appliance 10 may be used and an Internet session begun to correspond with the user's selected candidate. This session may access a typical search engine or may simply access a portal provided by a service provider. In any event, the selected candidate may be provided to the external software application. In this manner, the user may both indicate a desire for information/functions externally available without separately indicating that the candidate should be used externally to locate that information/function.

In one embodiment, the user may press a series of keys 21, which is interpreted so as to reduce or resolve ambiguity, candidates corresponding to that series of keys 21 may be displayed, and the user may select a desired candidate from the list of candidates provided on the monitor. When a connection to an external provider of information is indicated by the user, or functions are requested by the user, as may be determined by the user pressing the "Send" key, the following actions may occur. User selection of a displayed text element may copy or move the text element to a temporary storage location, which may be a memory location determined by the appliance 10. A browser application may be invoked and the candidate may be used as a search term to populate a search request text window or equivalent. Once a search term has populated the window, the search request may be generated automatically and from this point, normal browser operation may be supported.

If it is not clear whether a candidate selected by the user is intended for use externally or should be used in a function provided internally by the appliance 10, a key 21 may be pressed that is different from the key 21 used to indicate a desire for information/functions external to the appliance 10. For example, pressing the "Enter" key may indicate a desire to select the candidate, but not indicate anything about whether the candidate is intended to indicate a desire for information/functions external to the appliance 10. For example, if the candidate "camera" appears on the monitor 15 (note the italics indicates a function in this example) and the user does not wish to use the camera function of the appliance 10, but rather an external camera function, the user may press the "Enter" key to receive a list of options, and then select the option that allows use of an external camera function. Alternatively, the user might simply move the cursor on the monitor 15 to indicate the "camera" candidate and then press the "Send" key.

Other methods of communicating possible uses for a candidate may be employed. For example, in an appliance 10 equipped with a four-way selection switch, such as a joystick 37 type of cursor control, the user might move the cursor to the desired candidate by moving the joystick 37 away from or toward the user in order to move the cursor 22 up or down the monitor 15, and then by pressing the joystick 37 to the user's right, possible uses of the identified candidate may be provided on the monitor 15. For example, if the cursor 22 is moved so as to indicate the candidate "camera" and then the joystick is pressed to the user's right, the monitor 15 might first indicate the camera function provided by the appliance 10. A second press of the joystick 37 to the user's right might indicate use in a text message, and a third press of the joystick 37 to the user's right might indicate use in an Internet browser. Upon finding the desired use, the joystick 37 might be pressed into the appliance 10 to select that use and that candidate. Pressing the joystick 37 to the left might hide the list of possible uses, and thereby return the user to the candidate list.

To indicate the different possible uses of the candidate "camera", the appearance of the candidate may be altered or characters may be added to the candidate as the joystick 37 is pressed to the right. For example, initially, the candidate may be displayed as "camera" and then modified to appear as "camera" and then modified to appear as "camera?" in order to indicate respectively a desire to (A) use the camera provided by the appliance 10, (B) input text for a message and finally (C) use the word "camera" as a search term for an Internet browser. This is an example, and it should be recognized that a combination of text, additional characters, icons, sounds, vibration or other indication mechanism may be used to provide the user with the ability to indicate how a particular candidate should be used.

In another embodiment of the invention, pressing the joystick 37 to the right may result in providing a list of possible uses for the candidate. For example, upon moving the cursor 22 to the candidate "camera" and then pressing the joystick 37 to the right, the following list might be displayed: camera function provided by the appliance, text function provided by the appliance, and search term for Internet browser. Once the list of possible uses is displayed, pressing the joystick 37 away from or toward the user would result in the cursor 22 scrolling through the list. When the cursor 22 indicates the desired use, pressing the joystick 37 into the appliance 10 will select that use and that candidate. Pressing the joystick 37 to the left might hide the list of possible uses, and thereby return the user to the candidate list.

When the user indicates that a candidate should be used as a search term to locate information and/or functions external to the appliance 10, the selected search term may be sent via the communication channel 31 to a network server using a short message and then the search may be initiated remotely. This may be beneficial when the network 13 is experiencing high use since it does not require a high bandwidth link until the user is ready to review the search results. Once the message containing the search term has been sent from the appliance, a network acknowledgement may be used as an event trigger to invoke the browser interface. However a better method may be to return to the user a short message that includes a formatted link. When the message is opened by the appliance, the link may be selected, either manually or automatically, and a browser session may be activated. Although this may preserve bandwidth, a delay is possible.

It will now be recognized that the invention described herein may be used to automatically invoke necessary applications corresponding to and allows an external search consistent with its internal and external pre-conditioned discovery functions in response to data input, thus enabling a user to interact with search results with minimal effort.

Figure 3:
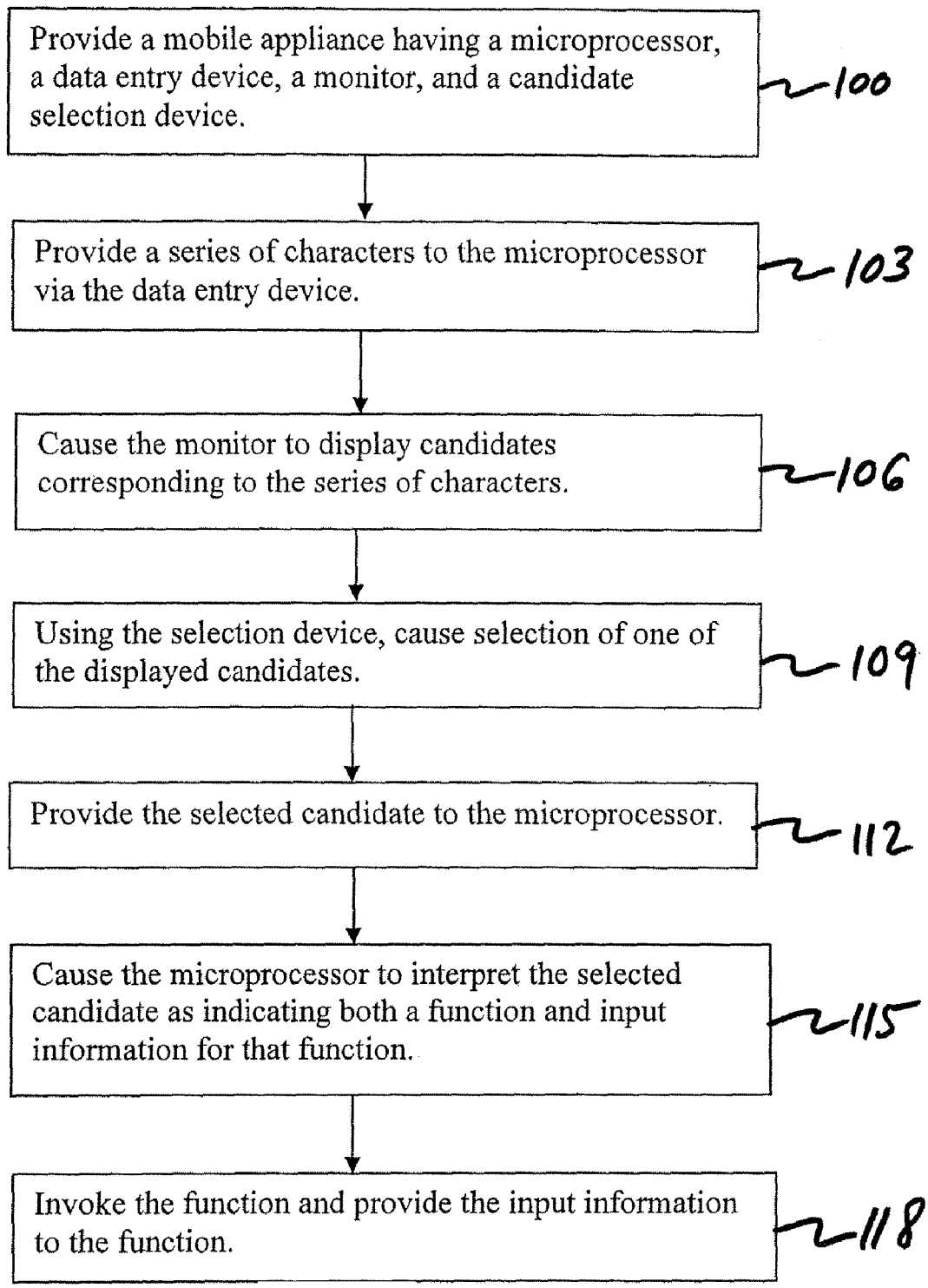
FIG. 3 is a flow diagram of depicting a method according to the invention.

The invention may be embodied as a method. FIG. 3 depicts one such method, in which a mobile appliance is provided 100. The mobile appliance may be like that described above. A series of characters may be provided 103 to the microprocessor via the data entry device. The microprocessor may respond by causing 106 the monitor to display candidates corresponding to the series of characters, and then the selection device may be used to cause selection 109 of one of the displayed candidates. The selected candidate may be provided 112 to the microprocessor, and the microprocessor may interpret 115 the selected candidate as indicating both a function and input information for that function. The function may then be invoked 118 and the series of characters may be provided as input information to the function. In this manner, the user is not required to first identify the function, and then input information to the identified function. Instead, from the user's perspective the prior art's two-step process is reduced and simplified to entry of a candidate and then selection of a candidate.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A mobile device, comprising:
   a microprocessor;
   a reduced keyboard operatively coupled with said microprocessor, said reduced keyboard having a plurality of keys capable of allowing a user to provide a series of key presses to the microprocessor, wherein the plurality of keys at least comprises a selection confirmation indicator, an external function specification indicator, and a plurality of character keys associated with a plurality of characters such that at said series of key presses of said character keys comprises an ambiguous input string having a plurality of disambiguation types including:
      textual field input;
      numerical phone dialing input;
      textual input describing a function internal to said mobile device; and
      textual input describing a function external to said mobile device and supported by said mobile device via a network application;
   wherein said microprocessor is configured for:
      disambiguating said ambiguous strings of key presses into logical candidates comprising words, phrases, and number strings matching a disambiguation type; and
   a monitor operatively coupled with said microprocessor, the monitor configured for simultaneously displaying all candidates, wherein candidates are displayed differently based on their respective disambiguation type;
   a candidate selection device operatively coupled with said microprocessor, wherein the selection device is configured for allowing said user to indicate an intention to select one of the displayed candidates;
   a memory device containing phone numbers of user contacts;
   a software module having instructions for causing the microprocessor to:
      interpret selection of a textual field input and confirmation using the confirmation indicator as an indication to enter said textual input into a fillable field;
      interpret selection of numeric phone dialing input and confirmation using the confirmation indicator as an instruction to dial a phone number from the user contacts matching a numeric disambiguation of said input string upon a user pressing the selection confirmation indicator;
      interpret selection of an internal function and confirmation using the confirmation indicator as an instruction to launch said internal function;
      interpret selection of an external function and confirmation using the confirmation indicator as an instruction to launch said network application; and
      interpret selection of any of said textual field input, said numeric phone dialing input, and said internal function and selection of said external function specification indicator as an instruction to search for an external function that is described by the textual field input, numerical phone dialing input, or textual input describing a function internal to said mobile device.

2. The appliance of claim 1, wherein the monitor is a liquid crystal display.

3. The appliance of claim 1, wherein the monitor has light emitting diodes.

4. The appliance of claim 1, wherein the selection device is a joystick which enables the user to move a cursor displayed on the monitor.

5. The appliance of claim 1, wherein the selection device has at least two keys which enable the user to move a cursor displayed on the monitor.

6. The appliance of claim 1, further comprising a text message processor configured for accepting textual field input and sending a text message thereof.

7. The appliance of claim 1, wherein said network application is an Internet browser.

8. The appliance of claim 7, wherein the series of characters are interpreted to be a search query.

9. The appliance of claim 1, wherein the external function resides on a computer that is remote from the appliance and accessible via said network application.

10. The appliance of claim 9, wherein the remote computer communicates with the network application via a wireless communication channel.

11. The appliance of claim 1, wherein the difference in display of candidates is accomplished by the appearance of the series of characters displayed on said monitor.

12. The appliance of claim 11, wherein the appearance of the series of characters is italics.

13. A method of using a mobile appliance, comprising:
   providing a mobile appliance having a microprocessor;
   a monitor operatively coupled with said microprocessor;
   a candidate selection device operatively coupled with said microprocessor; and
   a reduced keyboard operatively coupled with said microprocessor, wherein said reduced keyboard has a plurality of keys capable of allowing a user to provide a series of key presses to the microprocessor, wherein the plurality of keys at least comprises a selection confirmation indicator, an external function specification indicator, and a plurality of character keys associated with a plurality of characters such that at said series of key presses of said character keys comprises an ambiguous input string having a plurality of disambiguation types including:

textual input;

numerical phone dialing input;

text describing a function internal to said mobile device; and text describing a function external to said mobile device and supported by said mobile device via a network application;

accepting a series of characters to the microprocessor via the reduced keyboard;

disambiguating said ambiguous strings of key presses, by said microprocessor, into logical candidates comprising words, phrases, and number strings matching a disambiguation type;

using the microprocessor to cause the monitor to simultaneously display all candidates, wherein candidates are displayed differently based on their respective disambiguation type;

using the selection device to indicate an intention to select of one of the displayed candidates;

providing the selected candidate to the microprocessor;

causing the microprocessor to interpret the selected candidate by:

interpreting selection of a textual input and confirmation using the confirmation indicator as an indication of entering said textual input into a fillable field;

interpreting selection of numeric phone dialing input and confirmation using the confirmation indicator as an instruction to dial a phone number from the user contacts matching a numeric disambiguation of said input string upon a user pressing the selection confirmation indicator;

interpreting selection of an internal function and confirmation using the confirmation indicator as an instruction to launch said internal function; and interpreting selection of an external function and confirmation using the confirmation indicator as an instruction to launch said network application; and interpreting selection of any of said textual field input, said numeric phone dialing input, and said internal function and selection of said external function specification indicator as an instruction to search for an external function that is described by the textual field input, numerical phone dialing input, or textual input describing a function internal to said mobile device.

14. The method of claim 13, wherein the selection device includes a joystick operable to move a cursor to a displayed candidate, and moving the cursor to a displayed candidate precedes selection of the selected candidate.

15. The method of claim 13 wherein the selection device includes movement keys operable to move a cursor to a displayed candidate, and moving the cursor to a displayed candidate precedes selection of the selected candidate.

16. The method of claim 13, wherein the mobile appliance further comprises a text message processor, the method further comprising accepting textual field input and sending a text message thereof.

17. The method of claim 13, wherein the mobile appliance further comprises an Internet browser, and the series of characters are interpreted to be a search query.

18. The method of claim 13, wherein said network application is an Internet browser.

19. The method of claim 18, wherein the series of characters are interpreted to be a search query.

20. The method of claim 13, wherein invoking a function includes invoking an external function and returning a formatted link, the formatted link enabling a user to initiate use of the external function.

\* \* \* \* \*